United States Patent

[11] 3,609,461

[72] Inventors Robert E. Obenhaus
South Easton;
Lyle E. McBride, Jr., Norton; Irvin H. Farley, Attleboro, all of Mass.

[21] Appl. No. 743,193
[22] Filed July 8, 1968
[45] Patented Sept. 28, 1971
[73] Assignee Texas Instruments Incorporated
Dallas, Tex.

[54] APPARATUS FOR PROTECTING SEMICONDUCTOR DEVICES UTILIZING A TIME-VARYING REFERENCE SIGNAL
16 Claims, 2 Drawing Figs.

[52] U.S. Cl. .......... 317/33 SC, 317/36 TD
[51] Int. Cl. .......... H02h 3/08, H02h 7/10
[50] Field of Search .......... 317/13, 31, 33, 27, 36 TD; 307/202

[56] References Cited

UNITED STATES PATENTS

| | | | |
|---|---|---|---|
| 3,501,677 | 3/1970 | Hurtle .......... | 317/33 |
| 3,226,559 | 12/1965 | Klein .......... | 317/33 X |
| 3,312,862 | 4/1967 | Currin .......... | 317/33 X |
| 3,383,579 | 5/1968 | Han-Min Hung .......... | 317/33 X |
| 3,392,322 | 7/1968 | Giannamore .......... | 317/27 X |
| 3,407,314 | 10/1968 | Wolff .......... | 317/31 X |

*Primary Examiner*—J. D. Miller
*Assistant Examiner*—Harvey Fendelman
*Attorneys*—Harold Levine, Edward J. Connors, Jr., James P. McAndrews, John A. Haug and Gerald B. Epstein

ABSTRACT: Apparatus is described which measures an actual operating parameter of a gated semiconductor device while that device is being operated to control the energization of an electrical load and which causes the device to be deenergized if the value of the parameter exceeds a desired limiting value thereby preventing the device from being operated in an undesired mode.

Robert E. Obenhaus,
Lyle E. McBride, Jr.,
and Irvin H. Farley,
Inventors.
Koenig, Senniger,
Powers and Leavitt,
Attorneys.

APPARATUS FOR PROTECTING SEMICONDUCTOR DEVICES UTILIZING A TIME-VARYING REFERENCE SIGNAL

This invention relates to controls for an electrical load and more particularly to such controls including apparatus for protecting semiconductor current-switching devices employed in such controls.

While it has been known heretofore to employ semiconductor current-switching devices in place of a contactor to control the energization of an electrical load such as a motor, it has typically been necessary to provide devices having steady state current-carrying capabilities which are equal to the maximum current which could be drawn by the load under any condition, i.e. the current drawn when the rotor is locked in the case of an electric motor. The necessity of incorporating devices of such high capacity has therefore greatly increased the cost of such controls and has made them uneconomical in a variety of applications where their superior performance and high reliability would otherwise make them highly attractive.

Among the several objects of the present invention may be noted the provision of a solid state control for an electrical load; the provision of such a control which includes apparatus for protecting semiconductor switching devices utilized in the control so that devices having steady state current-carrying capabilities substantially matched to the steady state current drawn by the load may be employed; the provision of such a control in which loss of control over the semiconductor devices is prevented; the provision of such a control in which damagingly high junction temperatures in the semiconductor devices are avoided; the provision of such a control which is highly reliable; and the provision of such a control which is relatively simple and inexpensive. Other objects and features will be in part apparent and in part pointed out hereinafter.

Briefly, the present invention is useful in a control for an electrical load in which the load is supplied with current through a gated semiconductor current switching device for controlling the energization of the load and in which the device is selectively provided with gating current for rendering the device conductive thereby to energize the load. Apparatus according to the invention includes means for providing a feedback signal which varies as a function of an actual operating parameter of the semiconductor device. Means are provided which are controlled by the feedback signal for cutting off the supply of gating current to the switching device if the value of the parameter exceeds a desired limiting value. Accordingly, the device is prevented from being operated in an undesired mode.

The invention accordingly comprises the constructions hereinafter described, the scope of the invention being indicated in the following claims.

Figure 2:
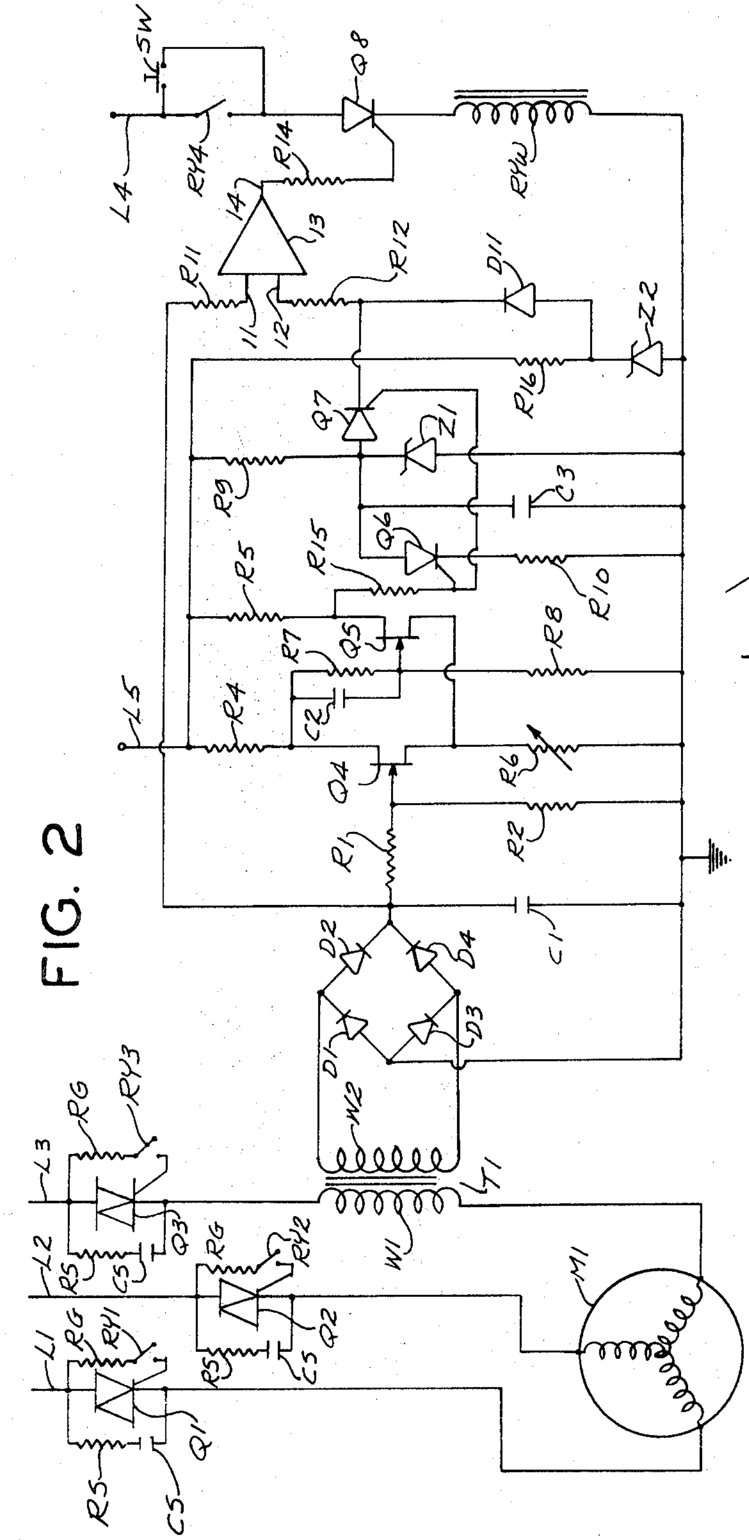
Figure 1:
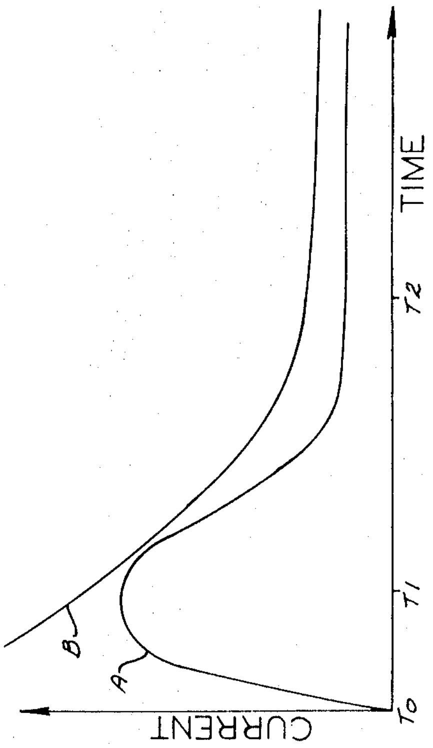

In the accompanying drawings in which one of various possible embodiments of the invention is illustrated, FIG. 1 is a graph having curves representing the current-carrying capability of a triac and the starting current drawn by an induction motor, both quantities being plotted as a function of time; and FIG. 2 is a schematic circuit diagram of a control according to this invention including apparatus for protecting semiconductor devices employed therein.

Corresponding reference characters indicate corresponding parts throughout the drawings.

Referring now to FIG. 1, the current drawn by a typical electrical induction motor upon starting is represented as a function of time in curve A. As indicated, the current rises to a peak value at time T1 and then decreases to a steady value substantially at time T2. If such a motor were to be energized through semiconductor current-switching devices without providing some sort of protection for the device themselves, it would typically be necessary to use devices having a steady state current-carrying capability which is substantially equal to the peak current drawn by the motor during starting. However, by providing apparatus for protecting the semiconductor devices themselves, advantage can be taken of the much higher short term current-carrying capabilities of semiconductor devices. As is known by those skilled in the art, semiconductor current-switching devices such as triacs and SCRs can, for short periods, carry currents which are several times greater than the maximum current which can be carried on a steady state basis. The current-carrying capability of a typical triac as a function of time is represented by curve B in FIG. 1. Thus, if it starts normally, a motor having a starting current characteristic as illustrated at A can be energized through a semiconductor current-switching device having a current-carrying capability characteristic as illustrated at B, without overloading the device. As may be seen, the current drawn by the motor falls below the curve B at all times even though the ultimate steady state or limiting value of current which can be conducted through the semiconductor device is substantially lower than the peak value of current drawn by the motor. When operating a semiconductor device in this manner, however, the device itself must be protected in case the motor does not start normally and a heavy current is drawn for a substantial length of time thereby exceeding the desired limiting value of current represented by the curve B.

Referring now to FIG. 2, an embodiment of the present invention providing such protection is illustrated. A three-phase motor M1 constitutes an electrical load whose energization is to be controlled in an on-off mode. Electrical power for energizing the motor is provided through leads L1, L2 and L3. These leads are connected to the motor through the anode power circuits of respective triacs Q1, Q2 and Q3. As is understood by those skilled in the art, triacs Q1–Q3 are gated semiconductor current-switching devices which are capable of controlling full-wave AC power. The primary winding W1 of a current transformer T1 is interposed in the lead to triac Q3 for providing a signal representative of the current drawn by the motor. As is understood by those skilled in the art, the current through the other leads can also be monitored and the signals thereby obtained can be averaged to provide for possible imbalance between the current levels in the different leads.

The anodes of each triac are shunted by a so-called *dv/dt* suppressor network comprising a capacitor CS and a resistor RS. Gating current is selectively provided to the gate terminal of each triac from its anode-two terminal through a gating resistor RG and a set of normally open relay contacts, RY1–RY3 respectively. Contacts RY1–RY3 are operated by a relay winding RYW which is selectively energized from an AC supply lead L4 through a gated power device such as SCR (silicon controlled rectifier) Q8. Winding RYW also controls a set of contacts RY4 which are interposed in the lead L4 for establishing a holding circuit for the relay. The contacts RY4 are shunted by a set of switch contacts SW which, as is described hereinafter, are employed in starting the motor M1.

As noted previously, the secondary winding W2 of current transformer T1 provides an AC signal having an amplitude which is substantially proportional to the current drawn by the motor M1. This AC signal is rectified by a rectifier bridge comprising diodes D1–D4 and filtered by a capacitor C1 to provide a DC signal which is representative of the current drawn by motor M1. This signal thus varies as a function of an actual operating parameter of the triacs Q1–Q3 and is employed as a feedback signal in protecting those devices.

This feedback signal is applied, through a resistor R11, to one input terminal (11) of a pair of input terminals 11 and 12 provided by a differential operational amplifier 13. Amplifier 13 is operative to provide, at an output terminal 14, an output signal which varies as a function of the voltage difference between the input signals applied to the input terminals 11 and 12. In this apparatus amplifier 13 is employed as a sense amplifier to control the conduction of SCR Q8 as a function of the relative amplitudes of the signals supplied to the input terminals 11 and 12, the output signal from the amplifier being applied to the gate of SCR Q8 through a resistor R14. The SCR Q8 is caused to conduct if the input signal applied to the terminal 12 is more positive than that applied to the input terminal 11 and is turned off if the signal applied to terminal 11 becomes more positive than that applied to terminal 12.

The feedback signal is also applied, through a voltage divider comprising a pair of resistors R1 and R2 to the gate of one (Q4) of a pair of field-effect transistors Q4 and Q5 which are interconnected in a Schmitt trigger circuit. DC power for energizing this circuitry is provided through a supply lead L5. The field-effect transistors provide a very high input impedance to the Schmitt trigger circuit so that it does not load the feedback signal source. The field-effect transistors Q4 and Q5 are provided with respective drain load resistors R4 and R5 and their source terminals are connected together and to ground through a common resistance constituted by a rheostat R6. The drain of transistor Q4 is coupled to the gate of transistor Q5 through a voltage divider comprising a pair of resistors R7 and R8. The resistor R7 is shunted by a capacitor C2 for providing the snap action of the Schmitt trigger circuit. When the feedback signal is below the operating threshold of the Schmitt trigger circuit, that circuit remains in a first state in which transistor Q4 is turned off and transistor Q5 conducts.

A charge storing capacitor C3 is normally charged through a resistor R9 to a voltage determined by a Zener diode Z1 which is connected across the capacitor. The capacitor C3 is also shunted by a circuit including the anode-cathode circuit of an SCR Q6 and a resistor R10. Capacitor C3 is also connected, through the anode-cathode circuit of an SCR Q7 and through a resistor R12, to the input terminal 12 of differential amplifier 13. The gate terminals of the SCRs Q6 and Q7 are connected, through a resistor R15, to the drain terminal of field-effect transistor Q5. The junction between SCR Q7 and resistor R12 is also connected, through a diode D11, to a junction between a resistor R16 and a Zener diode Z2 for setting a lower limit on the voltage which can be applied through resistor R12 to the input terminal 12 of differential amplifier 13.

The operation of this apparatus is substantially as follows. Before starting, gating current is provided to SCR Q8 by amplifier 13, since the voltage applied to terminal 12 is maintained at the level set by Zener diode Z2 and there is no feedback signal applied to input terminal 11. The motor is started by momentarily closing the switch SW which sets up a holding circuit through the contacts RY4. Upon initial energization of the motor M1, the feedback signal immediately causes the Schmitt trigger circuit to be tripped, turning on transistor Q4 and turning off transistor Q5. The turning off of transistor Q5 causes the voltage at its drain terminal to rise and this increased voltage is applied, through resistor R15, to the gate terminals of SCRs Q6 and Q7 thereby triggering those elements into conduction. Conduction through SCR Q7 causes the previously acquired voltage on capacitor C3 to be applied, through resistor R12, to the input terminal 12 of differential amplifier 13. At the same time, conduction through SCR Q6 causes capacitor C3 to start to discharge through resistor R10.

The voltage on capacitor C3 during its discharge follows a substantially logarithmic function which closely approximates the curve A of FIG. 1, the ultimate level to which this voltage decays being determined by the voltage maintained across the Zener diode Z2 It can thus be seen that the voltage applied to the input terminal 12 of amplifier 13 constitutes an analog of the current-carrying capability of the triacs Q1–Q3. In the apparatus illustrated, this analog signal is employed as a reference signal which, at each moment, represents a desired limiting value for the current drawn through these devices.

As was noted previously, the feedback signal, which represents the actual value of the current drawn by the motor, is applied to the input terminal 11 of the sense amplifier 13 and the sense amplifier 13 allows the SCR Q8 to remain in conduction only while the instantaneous amplitude of the voltage applied to the input terminal 12, the reference signal, exceeds that applied to the input terminal 11, the feedback signal. Accordingly, as long as the actual value of current drawn through the triacs, as represented by the feedback signal, does not at any instant exceed the desired value, as represented by the analog or reference signal, the relay winding RYW will remain energized thereby closing the triggering circuits for the triacs Q1–Q3 so that they continue to supply current to the motor M1. Thus, if the motor M1 starts normally, the feedback signal will substantially approximate the curve A in FIG. 1 and thus the condition for continued energization of the motor will be met. If, on the other hand, the motor does not start normally but rather is stalled so that a heavy current is drawn for an extended length of time, the feedback signal will exceed the reference signal at some point in time indicating that the actual current drawn has exceeded the instantaneous desired limiting value. The differential sense amplifier 13 will therefore turn off the SCR Q8, deenergizing the relay winding RYW which in turn cuts off the triacs Q1–Q3 before they overheat to such extent that gate control is lost due to increased junction temperature.

From the foregoing, it can be seen that this apparatus protects the semiconductor current-switching devices themselves and that this protect is afforded on a time weighted basis so that an electrical load, such as a motor, can be energized through semiconductor devices whose current-carrying capacities and characteristics are substantially matched to the characteristics of the load. It is therefore unnecessary to employ semiconductor devices whose steady state current-carrying capacity is equal to the short term current peak loads which are experienced only temporarily, e.g. upon starting of an induction motor load.

It should be noted that other types of gated semiconductor current-switching devices, such as SCRs, are capable of carrying peak currents which are many times their long-term current rating and that apparatus according to this invention may be used to protect such devices. It should also be understood that actual operating parameters other than current drawn may be monitored and compared with desired limiting values for protecting the semiconductor devices. For example, the level of gating current required to turn on gated semiconductor devices may be monitored as specifically described in copending application Ser. No. 743,155 filed July 8, 1968.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a control for an electrical load in which said load is supplied with current through a gated semiconductor current-switching device for controlling the energization of said load and in which said device is selectively provided with gating current for rendering said device conductive thereby to energize said load, apparatus for protecting said device comprising:

transformer means responsive to conduction of said gated semiconductor switching device for providing a feedback signal which varies as a function of an operating parameter related to the heating of said gated semiconductor current-switching device, and means controlled by said feedback signal for cutting off said gating current if the value of said parameter exceeds a desired limiting value, whereby said device is prevented from being operated in an undesired mode.

2. Apparatus as set forth in claim 1 wherein said load is an electric motor.

3. Apparatus as set forth in claim 1 wherein said feedback signal varies as a function of the current drawn by said load.

4. In a control for an electrical load in which said load is supplied with current through a gated semiconductor current-switching device for controlling the energization of said load and in which said device is selectively provided with gating current for rendering said device conductive thereby to energize said load, apparatus for protecting said device comprising:

transformer means responsive to conduction of said gated semiconductor switching device for providing a feedback signal which varies as a function of an operating parameter related to the heating of said gated semiconductor current-switching device, and means controlled by said feedback signal including a relay having contacts for cutting off said gating current if the value of said parameter exceeds a desired limiting value, whereby said device is prevented from being operated in an undesired mode.

5. In an on-off control for a selectively energizable load in which said load is supplied with current through a gated semiconductor current-switching device for controlling the energization of said load and in which said device is selectively provided with gating current for rendering said device conductive thereby to energize said load, apparatus for protecting said device comprising:

means for providing a feedback signal which varies as a function of an operating parameter related to the heating of said device;

means for providing a reference signal which represents a desired limiting value of said parameter; and means controlled by said feedback and reference signals for cutting off said gating current if the value of said parameter exceeds said desired limiting value whereby said device is prevented from being operated in an undesired mode.

6. In an on-off control for an electric motor in which said motor is supplied with current through a gated semiconductor current-switching device for controlling the energization of said motor and in which said device is selectively provided with gating current for rendering said device conductive thereby to energize said motor, apparatus for protecting said device comprising:

means for providing a feedback signal having an amplitude which varies as a function of the current drawn by said motor;

means for generating a time-varying reference signal the amplitude of which is an analog of the current-carrying capability of said device; and means for cutting off said gating current if the instantaneous amplitude of said feedback signal exceeds the instantaneous amplitude of said reference signal whereby said device is prevented from being overloaded.

7. Apparatus as set forth in claim 6 wherein said feedback signal providing means includes a current transformer responsive to current drawn by said load.

8. Apparatus as set forth in claim 7 wherein said feedback signal providing means further comprises rectifier means for converting an AC signal obtained from said current transformer to a DC feedback signal.

9. Apparatus as set forth in claim 6 wherein said reference signal generating means comprises a capacitor and means for discharging said capacitor at a predetermined rate.

10. Apparatus as set forth in claim 6 wherein said reference signal generating means comprises a capacitor and means operative upon initial energization of said motor for discharging said capacitor at a predetermined rate.

11. Apparatus as set forth in claim 10 wherein said means for discharging said capacitor includes a Schmitt trigger circuit responsive to current drawn by said motor for initiating discharging of said capacitor.

12. Apparatus as set forth in claim 11 wherein said means for discharging said capacitor further comprises a resistor and an SCR for selectively connecting said resistor across said capacitor and wherein said SCR is triggered by said Schmitt trigger circuit.

13. Apparatus as set forth in claim 12 including a second SCR for applying the voltage on said capacitor to said means for cutting off said gating current and wherein said second SCR is triggered by said Schmitt trigger circuit.

14. Apparatus as set forth in claim 6 wherein said feedback and reference signals are DC voltages and wherein said means for cutting off said gating current includes a sense amplifier responsive to the relative amplitudes of said feedback and reference signals.

15. Apparatus as set forth in claim 14 wherein said means for cutting off said gating current comprises a relay having contacts for controlling said gating current and a semiconductor controlled rectifier for controlling the energization of said relay and wherein said sense amplifier controls the gating of said rectifier.

16. Apparatus as set forth in claim 6 wherein said motor is a three-phase AC motor and wherein current is supplied to each phase thereof through a triac.